United States Patent
Apelsmeier et al.

(10) Patent No.: US 10,992,208 B2
(45) Date of Patent: Apr. 27, 2021

(54) CONVERTER DEVICE FOR AN ELECTRICAL MACHINE, MOTOR VEHICLE, AND METHOD FOR OPERATING A CONVERTER DEVICE

(71) Applicant: AUDI AG, Ingolstadt (DE)

(72) Inventors: Andreas Apelsmeier, Pollenfeld (DE); Stephan Brüske, Kiel (DE)

(73) Assignee: AUDI AG, Ingolstadt (DE)

( * ) Notice: Subject to any disclaimer, the term of this patent is extended or adjusted under 35 U.S.C. 154(b) by 317 days.

(21) Appl. No.: 15/945,776

(22) Filed: Apr. 5, 2018

(65) Prior Publication Data

US 2018/0294697 A1 Oct. 11, 2018

(30) Foreign Application Priority Data

Apr. 11, 2017 (DE) .......................... 10 2017 206 169.3

(51) Int. Cl.
*H02K 11/33* (2016.01)
*H02M 1/32* (2007.01)
(Continued)

(52) U.S. Cl.
CPC ............ *H02K 11/33* (2016.01); *H02K 11/25* (2016.01); *H02K 11/27* (2016.01); *H02M 1/32* (2013.01); *H02P 29/0241* (2016.02)

(58) Field of Classification Search
CPC ........................ H02M 1/32; H02M 2001/322
See application file for complete search history.

(56) References Cited

U.S. PATENT DOCUMENTS 4,480,312 A * 10/1984 Wingate ................. G01D 5/248
374/167
2008/0304197 A1 12/2008 Higashi
(Continued)

FOREIGN PATENT DOCUMENTS

CN 102195503 A 9/2011
CN 102412561 A 4/2012
(Continued)

OTHER PUBLICATIONS

German Examination Report dated Dec. 11, 2017 of corresponding German application No. 102017206169.3; 14 pgs.
(Continued)

*Primary Examiner* — Terrance L Kenerly
(74) *Attorney, Agent, or Firm* — Maier & Maier, PLLC

(57) ABSTRACT

A converter device for an electrical machine, including a switch with a plurality of switching elements to generate a multiphase alternating current for the electrical machine and a plurality of phase conductors for conducting an alternating current generated in each case by the switch to the electrical machine, wherein a number of first phase conductors that is one less in number than the total number of phase conductors are coordinated with a current measuring means, and a control device is provided, which is designed to determine a calculated value describing a current along the second phase conductor from first measured values of the current measuring means, wherein the control device is designed to check the plausibility of the calculated value on the basis at least one second measured value of a short circuit detecting device coordinated with a switching element.

9 Claims, 2 Drawing Sheets

(51) Int. Cl.
*H02P 29/024* (2016.01)
*H02K 11/25* (2016.01)
*H02K 11/27* (2016.01)

(56) References Cited

U.S. PATENT DOCUMENTS

| | | | |
|---|---|---|---|
| 2011/0221370 A1 | 9/2011 | Fukuta et al. | |
| 2012/0068645 A1* | 3/2012 | Tsuji .................. | H02M 1/32 |
| | | | 318/400.21 |
| 2016/0155278 A1* | 6/2016 | Nozawa ................ | B60W 20/50 |
| | | | 701/22 |

FOREIGN PATENT DOCUMENTS

| | | |
|---|---|---|
| CN | 103457505 A | 12/2013 |
| CN | 104237602 A | 12/2014 |
| CN | 105388356 A | 3/2016 |
| DE | 10249568 A1 | 5/2004 |
| DE | 102005045323 A1 | 4/2006 |
| DE | 102012209276 A1 | 12/2013 |
| DE | 102014107561 A1 | 12/2014 |

OTHER PUBLICATIONS

European Search Report dated Sep. 4, 2018, in connection with corresponding EP Application No. 18163260.5 (5 pgs.).
Chinese Office Action dated Jan. 14, 2021, in connection with corresponding CN Application No. 201810314898.8 (42 pp., including machine-generated English translation).

* cited by examiner

CONVERTER DEVICE FOR AN ELECTRICAL MACHINE, MOTOR VEHICLE, AND METHOD FOR OPERATING A CONVERTER DEVICE

FIELD

The invention relates to a converter device for an electrical machine, comprising switching means with a plurality of switching elements to generate a multiphase alternating current for the electrical machine and a plurality of phase conductors for conducting an alternating current generated each time by a switching means to the electrical machine, wherein a number of first phase conductors, being one less in number than the total number of phase conductors, are coordinated with a current measuring means, and a control device is provided, which is designed to determine a calculated value describing a current along the second phase conductor from first measured values of the current measuring means.

BACKGROUND

Electrical machines, which are actuated with a multiphase alternating current, especially a three-phase rotary current, require a converter device, which generates the multiphase alternating current from a d.c. voltage or an intermediate circuit voltage. In order to regulate the electrical machine with the aid of a respective alternating current carried by way of the first phase conductors to the electrical machine, its current intensity needs to be detected by a current measuring means. Here, in a circuit layout with no neutral conductor, it is enough to detect the currents along a number of first phase conductors, being fewer in number by one than the total number of phase conductors, and simply to calculate the current of the second phase conductor. High accuracy requirements are placed on the current measuring means, at present tolerating only deviations of approximately 3 to 5%. Within the automotive industry, even further safety requirements are placed on the determining of the current intensity of the alternating current flowing along the phase conductors. Thus, ISO 26262 provides the safety class ASIL D for the accuracy of the determination of the torque of the electrical machine, which can be fulfilled by a redundant determination of the currents flowing along the phase conductors.

For this purpose, it is known from the prior art to coordinate a current measuring means with the second phase conductor as well and thus to measure the current intensities redundantly. The drawback here is that such an additional current measuring means requires a large structural space and not least of all makes the converter device more costly. In addition, the periphery for such a current measuring means needs to be provided, such as a power supply, a wiring, EMC measures, and a channel for the analog to digital conversion.

SUMMARY

Therefore, the invention is based on the object of enabling a redundant determination of the alternating currents of the phase conductors with less expense and fewer structural space requirements.

This object is achieved according to the invention by a converter device for an electrical machine of the kind mentioned above in that the control device is designed to check the plausibility of the calculated value with the aid of at least one second measured value of a short circuit detecting device coordinated with a switching element.

The invention is based on the concept of using, instead of an additional current measuring means for the second phase conductor, at least one second measured value of the short circuit detecting device, which is coordinated with a switching element, for the redundant determination of the current intensities and thereby to check on the plausibility of the calculated value formed from the first measured values based on the one or more second measured value(s). Since such short circuit detecting devices are typically provided in any case in a converter device for recognizing of bridge and/or winding short circuits, the at least one second measured value can be obtained advantageously without providing any additional structural elements. It should be noted in this case that the second measured values of short circuit detecting devices do not in themselves meet the accuracy requirements for regulating the torque and/or the rotational speed of the electrical machine according to the current prior art; however they afford a sufficient accuracy for checking on the plausibility of the currents along the phase conductors.

The switching means of the converter device according to the invention are typically designed as a half-bridge circuit. The switching elements of a respective switching means may be hooked up in series, with the phase conductor emerging from a middle tapping point between the switching elements. A respective current measuring means may comprise a shunting resistor hooked up in the phase conductors. Alternatively, a respective current measuring means may have a magnetic sensor, such as, for example, a Hall sensor, for the current measurement. The control device is usually designed to regulate the torque and/or the rotational speed of the electrical machine. The control device may have terminals for connection lines to the current measuring means and the short circuit detecting devices.

In the converter device according to the invention, the control device is moreover preferably designed to determine a gain drift of a current measuring means for the checking of plausibility. By a gain drift is meant the proportional deviation of the first measured value from the actual current along the first phase conductor, a deviation that occurs during a fault in the current measuring means. If such a gain drift occurs in the course of the operation of the converter device, there will be an erroneous first measured value, which will also affect the calculated value. However, this error does not affect the second measured value of the short circuit detecting device, so that the gain drift is recognizable from a lack of plausibility of the calculated value and/or a first measured value with respect to at least one second measured value. An allocation of first and second measured values can be saved in a memory unit of the control device.

It is furthermore preferred in the converter device according to the invention that the control device is moreover designed for determining the plausability of a deviation of a first measured value of a current measuring means from at least one second measured value in regard to a switching element of the switching means which generates the alternating current carried along the first phase conductor associated with the current measuring means. It may therefore be determined, with the aid of one or more second measured values of the switching element or a particular switching element, whether the first measured value is plausible. For example, different second measured values of the short circuit detecting devices may be recorded with different first measured values for a trouble-free operating instance, so that a measurement error occurring during the operation of the converter device is recognizable.

Alternatively or additionally, it may be provided in the converter device according to the invention that the control device is moreover designed to determine a deviation of the calculated value from a second measured value in regard to a switching element which generates the current along the second phase conductor, for the checking of plausibility. In this case, second measured values may be recorded with plausible calculated values in a trouble-free operating instance of the first current measuring means, wherein a deviation of the calculated value from a second measured value can be determined. It is also possible here for an allocation of calculated values with second measured values to be saved in the memory unit or a memory unit of the control device.

In order to improve the accuracy of the plausibility check for the calculated value, a temperature detecting device may be provided to detect and/or model at least one temperature at one switching element or at switching elements, wherein the control device is moreover designed to take account of the temperature in the plausibility check, especially for correcting the one or more second measured value(s). This technique is based on the knowledge that the second measured values detected with respect to the switching elements are dependent on the temperature of the switching element. When transistors are used as the switching elements, for example, this is the junction temperature. The temperature detecting device preferably has a temperature sensor, which detects the temperature at a location in a power module that provides the switching elements, inferring from this temperature, the temperature of the switching elements. It is also possible to assign a temperature sensor of the temperature detecting device to each switching means or each switching element. The temperature sensor or the temperature sensors of the temperature detecting device may be temperature-dependent resistors or temperature-sensitive diodes. Alternatively or additionally, the temperature detecting device may determine the temperature with the aid of a temperature model, for example, on the basis of operating parameters of the converter device and/or measured values of the temperature sensor or sensors.

Appropriately, the control device is moreover designed to deliver an error signal and/or deactivate the converter device when the presence of an erroneous calculated value results from the plausibility check. Alternatively or additionally, when second measured values are present in regard to switching elements of different switching means, a correction of the erroneous calculated value may also be produced with the aid of the second measured values.

Typically, a particular switching means comprises two IGBTs or two power MOSFETs as switching elements.

Preferably, the short circuit detecting device for providing the second measured value comprises a measurement means hooked up to a sense output of the switching element. Such a sense output is typically a fourth transistor connection, at which a current correlated with the collector current or drain current can be delivered. A resistor is appropriately hooked up to the sense connection, and the voltage falling across this resistor or the current flowing through the resistor can be detected by means of a measurement means of the short circuit detecting device, as the second measured value. Alternatively or additionally, the short circuit detecting device for providing the second measured value can have a measurement means hooked up to detect a voltage falling across the switching element, especially a collector-emitter voltage and/or a drain-source voltage. In this case, the detected voltage may be used as the second measured value.

The object on which the invention is based is furthermore achieved according to the invention by a motor vehicle, comprising an electrical machine for partial or total propulsion of the motor vehicle and a converter device according to the invention, wherein the phase conductors are connected to the electrical machine.

Furthermore, the object on which the invention is based is achieved according to the invention by a method of operating a converter device for an electrical machine, comprising a switching means generating a multiphase alternating current for the electrical machine with a plurality of switching elements and a plurality of phase conductors, carrying each time an alternating current to the electrical machine that is generated by a switching means, wherein a number of first phase conductors, being one less in number than the total number of phase conductors, are coordinated with a current measuring means, and a calculated value describing a current along the second phase conductor is determined from first measured values of the current measuring means. The method according to the invention is further characterized in that the calculated value is checked for plausibility with the aid of at least one second measured value of a short circuit detecting device coordinated with a switching element.

All of the statements relating to the converter device according to the invention may be applied analogously to the motor vehicle according to the invention and the method according to the invention, so that the aforementioned advantages may also be achieved with them.

BRIEF DESCRIPTION OF THE DRAWINGS

Further advantages and details of the invention will emerge from the exemplary embodiments described below, as well as the drawings. These drawings are schematic representations and they show.

DETAILED DESCRIPTION OF THE DRAWINGS

Figure 1:
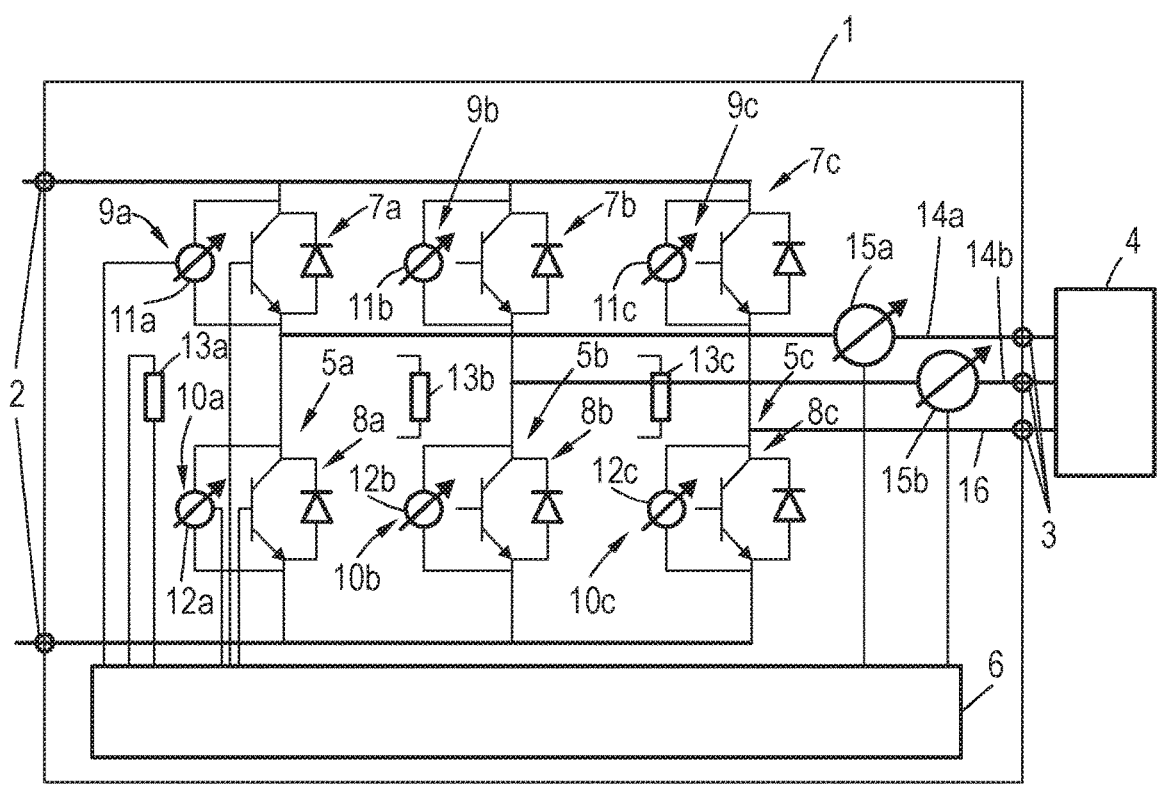
FIG. 1 a circuit diagram of a first exemplary embodiment of a converter device according to the invention.

FIG. 1 shows a circuit diagram of a first exemplary embodiment of a converter device 1, which converts a d.c. voltage applied at its input 2 into a three-phase alternating current at its output 3, to which an electrical machine 4 is connected.

Between the high and the low potential of the d.c. voltage are hooked up three switching means 5a, 5b, 5c, being substantially identical in construction, which shall be explained more closely below on the example of the switching means 5a. FIG. 1 shows connections to a control device 6 of the converter device 1 only for the switching means 5a and its associated components; these connections are not shown for the switching means 5b, 5c for reasons of clarity. The switching means 5a comprises two switching elements 7a, 8a, which are interconnected as a half-bridge, and are formed by power transistors, such as IGBTs or power MOSFETs. The gate terminals are connected to the control device 6. By actuating the gate terminals, the control device 6 regulates the torque and the rotational speed of the electrical machine 4.

The switching elements 7a, 8a are each associated with a short circuit detecting device 9a, 10a having a measurement means 11a, 12a for detecting a voltage falling across the switching element 7a, 8a. In the case of an IGBT, this voltage is its collector-emitter voltage and in the case of a power MOSFET, it is a drain-source voltage. In addition, the switching means 5a is associated with a temperature detecting device 13a with a temperature-dependent resistor as the temperature sensor, which detects a temperature in the vicinity of the switching elements 7a, 8a and/or models it from operating parameters of the converter device 1, from which an instantaneous junction layer temperature of the transistors can be derived.

From the middle tapping points of the switching means 5a, 5b there emerge first phase conductors 14a, 14b, each of which is associated with a current measuring means 15a, 15b. These detect the alternating current flowing along a respective first phase conductor 14a, 14b as a first measured value and are connected to the control device 6 for the evaluation of the first measured values. No such current measuring means is associated with a second phase conductor 16, which emerges from the switching means 5c. The current intensity of the alternating currents flowing along the second phase conductor 16 is computed as a calculated value by the control device 6 from the first measured values of the current measuring means 15a, 15b.

The short circuit detecting devices 10a-c, 9a-c are likewise connected to the control device 6 and provide it with a second measured value for each switching element 7a-c, 8a-c. With the aid of these second measured values, a short circuit of one of the switching elements 7a-c, 8a-c may be determined, if a switching element 7a-c, 8a-c has low resistance for a continuously long time. In this error situation, the control device 6 deactivates the converter device 1.

The control device 6 is moreover designed to check the plausibility of the calculated value describing the current along the second phase conductor 16 with the aid of the second measured values of the short circuit detecting devices 9a-c, 10 a-c. This is required in order to fulfill safety regulations according to ISO 26262 with a redundant determination of the currents along the phase conductors 14a, 14b, 16 to be included in the regulating process. For this, the control device 6 computes the current flowing across a respective switching element 7a-c, 8a-c from the voltages described by the second measured values and detected by the measurements means 11a-c, 12a-c and the provided gate voltages, on the basis of a characteristic curve, and checks the plausibility of the calculated value for the current flowing through the second phase conductor 16. If need be, the control device 6 will correct the second measured values with the aid of the measured values of the temperature detecting devices 13a-c.

The control device 6 for the plausibility check determines, for example, a deviation of the first measured values of the current measuring means 15a from the second measured values of the short circuit detecting device 9a and/or from the second measured values of the short circuit detecting device 10a. For this, corresponding second measured values are recorded with first measured values for an error-free operation of the current measuring means 15a and saved in a look-up table inside a memory unit of the control device 6. Now, if a gain drift of the current measuring means 15a occurs, which affects the calculated value on account of the resulting false first measured values, the control device 6 will recognize the gain drift on the basis of the deviation and determine that the calculated value is not plausible. Erroneous first measured values of the current measuring means 15b may be detected analogously on the basis of a deviation from the second measured values of the short circuit detecting device 9b and/or from the second measured values of the short circuit detecting device 10b.

Another possibility for checking the plausibility of the calculated value is the determination of a deviation of the calculated value from a second measured value of the short circuit detecting device 9c and/or the short circuit detecting device 10c. If the currents flowing through the switching elements 7c, 8c deviate from the calculated value, which describes the alternating current along the second phase conductor 16 which is generated by the switching means 5c, it may be concluded that the calculated value is not plausible. Here as well, corresponding calculated values can be recorded with second measured values and saved, for example, as a look-up table in the memory unit of the control device 6.

In the event of an implausible calculated value, the control device 6 delivers an error signal at a signal output, which is not represented. As a further step, it may deactivate the converter device 1 in the event of a fault, or it may correct the calculated value on the basis of a plurality of second measured values of a plurality of short circuit detecting devices 9a-c, 10a-c.

Figure 2:
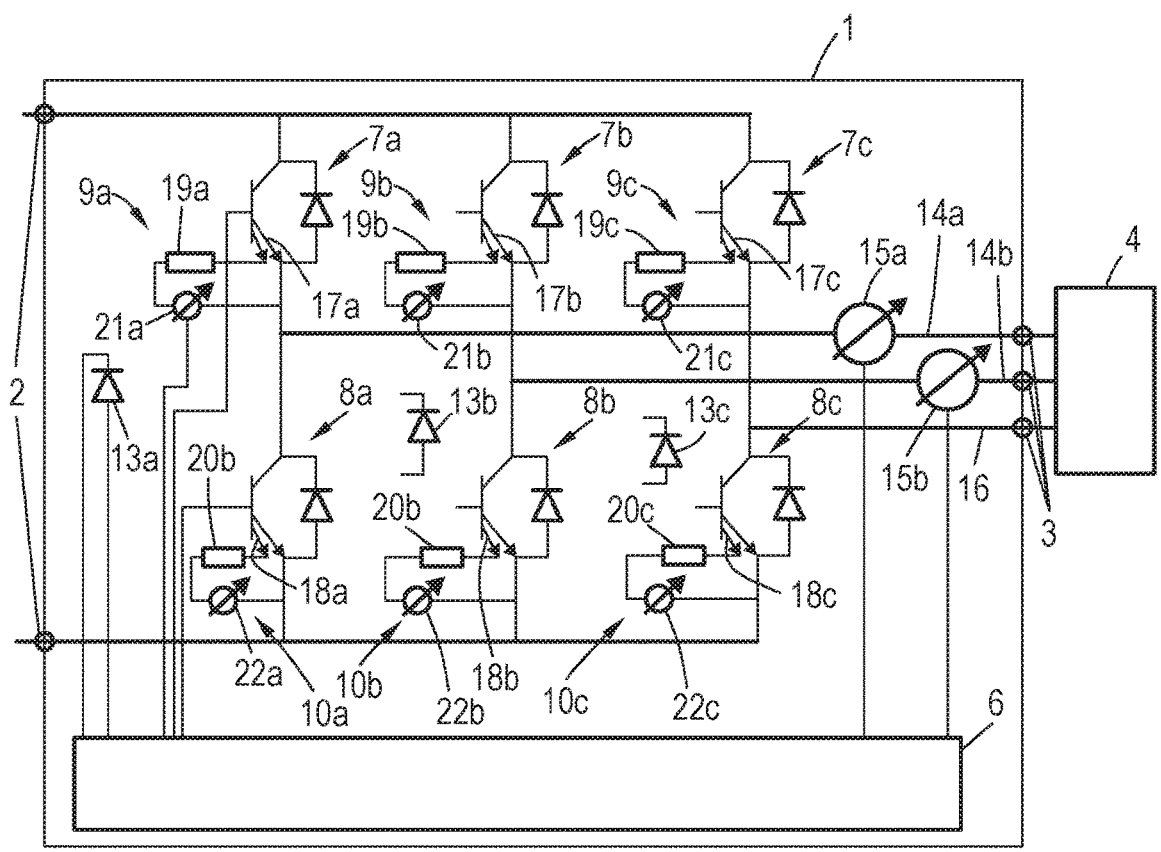
FIG. 2 a circuit diagram of a second exemplary embodiment of a converter device according to the invention.

FIG. 2 shows a circuit diagram of a second exemplary embodiment of a converter device 1 that differs from that of the exemplary embodiment shown in FIG. 1 in that the switching elements 7a-c, 8a-c are each formed as transistors with a sense output 17a-c, 18a-c as the fourth transistor terminal. The short circuit detecting devices 9a-c, 10a-c in this case each have a resistor 19a-c, 20a-c connected to the sense output 17a-c, 18a-c, through which flows a measurement current, which is correlated with the collector or drain current. Alternatively, measurement means 21 a-c, 22a-c may also be used to detect the voltage falling across a respective resistor 19a-c, 20a-c.

In the exemplary embodiment of FIG. 2, in place of temperature-dependent resistors, temperature-sensitive diodes are provided as the temperature sensors of the temperature detecting devices 13a-c. However, the design of the temperature detecting devices 13a-c is basically independent of the remaining design of the converter device 1, so that the diodes may also be used in the exemplary embodiment of FIG. 1, and the temperature-dependent resistors may also be used in the exemplary embodiment of FIG. 2.

Figure 3:
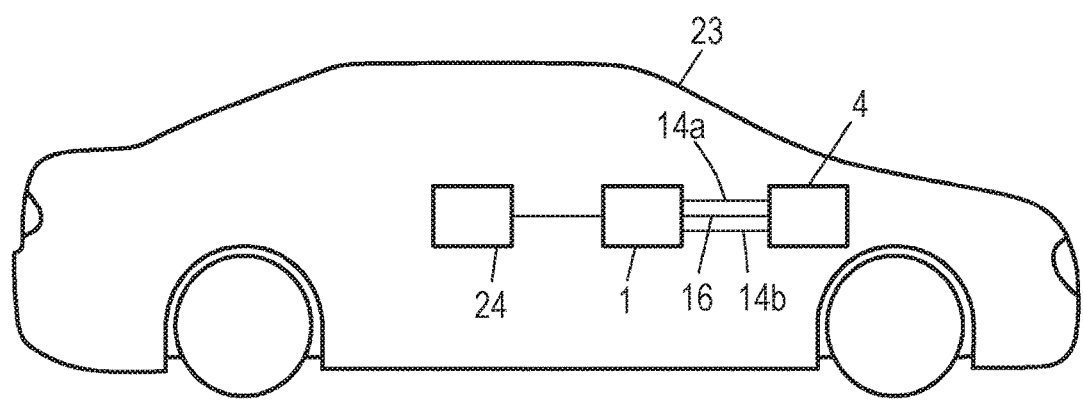
FIG. 3 a schematic design of an exemplary embodiment of a motor vehicle according to the invention.

FIG. 3 shows a schematic diagram of an exemplary embodiment of a motor vehicle 23, comprising an electrical machine 4 for the partial or total propulsion of the motor vehicle 23 as well as a converter device 1 according to one of the above explained exemplary embodiments. At its input side, the converter device 1 is supplied with a d.c. voltage from a high-voltage battery 24. The output-side phase conductors 14a, 14b, 16 are connected to the electrical machine 4.

The invention claimed is:

1. A converter device for an electrical machine, comprising:
   switching means with a plurality of switching elements to generate a multiphase alternating current for the electrical machine and a plurality of phase conductors for conducting an alternating current that is generated in each case by the switching means to the electrical machine,
   wherein a number of first phase conductors that is one less in number than the total number of phase conductors are coordinated with a current measuring means, and a control device is provided, which is designed to determine a calculated value describing a current along the second phase conductor from first measured values of the current measuring means, wherein the control device checks the plausibility of the calculated value on the basis of at least one second measured current value of a short circuit detecting device coordinated with a switching element, and on the basis of voltages described by the second measured current values; and a temperature detecting device configured to detect and/or model at least one temperature at one of the switching element or switching elements, wherein the control device corrects the one or more second measured value(s) based on the temperature and based on the voltages described by the second measured current values.

2. The converter device according to claim 1, wherein the control device determines a gain drift of a current measuring means for the checking of plausibility.

3. The converter device according to claim 1, wherein, for the checking of plausibility, the control device determines a deviation of a first measured value of a current measuring means from at least one second measured value in regard to one of the switching element of the switching means that generates the alternating current carried along the first phase conductor associated with the current measuring means.

4. The converter device according to claim 1, wherein, for the checking of plausibility, the control device determines a deviation of the calculated value from a second measured value in regard to one of the switching elements that generates the alternating current along the second phase conductor.

5. The converter device according to claim 1, wherein the control device determines an error signal and/or to deactivate the converter device when the presence of an erroneous calculated value results from the plausibility check.

6. The converter device according to claim 1, wherein in each case, one of the switching means includes two IGBTs or two power MOSFETs as switching elements.

7. The converter device according to claim 1, wherein the short circuit detecting device for providing the second measured value includes a measurement means hooked up to an interconnected sense output of the switching element and/or an interconnected measurement means for detecting a voltage falling across the switching element, especially a collector-emitter voltage and/or a drain-source voltage.

8. A motor vehicle, comprising an electrical machine for partial or total propulsion of the motor vehicle and a converter device according to claim 1, wherein the phase conductors are connected to the electrical machine.

9. A method for operating a converter device for an electrical machine, comprising:

switching means with a plurality of switching elements generating a multiphase alternating current for the electrical machine and a plurality of phase conductors, each conducting an alternating current that is generated by the switching means to the electrical machine, wherein a number of first phase conductors that is one less in number than the total number of phase conductors are coordinated with a current measuring means, and a calculated value describing a current along the second phase conductor is determined from first measured values of the current measuring means, wherein the calculated value is checked for plausibility on the basis of at least one second measured current value of a short circuit detecting device coordinated with a switching element; and detecting at least one temperature at one of the switching element or switching elements, wherein the control device corrects the one or more second measured value(s) based on the temperature and based on the voltages described by the second measured current values.

* * * * *